United States Patent [19]

Lykken et al.

[11] 3,749,333
[45] July 31, 1973

[54] DEAD RECKONING BACK-UP NAVIGATIONAL SYSTEM FOR A DRONE

[75] Inventors: Lowell O. Lykken, Westlake Village; Erwin E. Schulze, Jr., Placentia, both of Calif.

[73] Assignee: Lear Siegler, Inc., Santa Monica, Calif.

[22] Filed: June 15, 1972

[21] Appl. No.: 263,155

[52] U.S. Cl. ............................................. 244/3.15
[51] Int. Cl. ... F42b 15/10, F42b 15/02, F42b 15/32
[58] Field of Search .......................... 244/3.15, 3.17

[56] References Cited
UNITED STATES PATENTS
3,372,890  3/1968  Borgard et al. ................... 244/3.17
3,416,752  12/1968  Hembree .......................... 244/3.17

Primary Examiner—Benjamin A. Borchelt
Assistant Examiner—Thomas H. Webb
Attorney—Pastoriza & Kelly

[57] ABSTRACT

The heading and range to a recovery area for a drone on a mission are continuously monitored and stored on board the drone. Any failure in the primary navigational system in the drone is detected and the stored heading and stored range are available for comparison with the on-board compass reading of the drone and an on-board air speed integrator for the drone. Any deviation between the drone compass reading and the stored heading is corrected by generation of an error signal to operate the flight controls of the auto-pilot on the drone to steer the drone towards the recovery area. A landing command signal, in turn, is provided only when the integrated air speed equals the stored range. Corrections for wind conditions are automatically included in the stored heading and range information so that accurate dead reckoning back to the recovery area is realizable. A wholly self-contained means is thus provided for returning a drone to a specified recovery area in the event of failure of its primary navigational system at any point in time during its mission.

4 Claims, 2 Drawing Figures

DEAD RECKONING BACK-UP NAVIGATIONAL SYSTEM FOR A DRONE

This invention relates generally to drone operations and more particularly to a back-up navigational system for automatically returning a drone to a desired recovery area in the event of failure in its primary navigational system.

BACKGROUND OF THE INVENTION

Pilotless aircraft or drones are conventionally provided with a guidance and control system including primary navigational means for automatically operating the flight controls of the drone to cause the drone to fly in accord with a desired mission; that is, along a particular flight path calculated in advance. Such drones may be used for reconnaissance work, aerial photography, and the like. Normally, the programmed flight mission will cause the drone to land in a specified recovery area after the mission has been completed so that the drone and its on-board equipment can be recovered.

One typical type of primary navigation system would include an on-board navigational radio receiver providing position signals indicating the existing position of the drone at all times in relation to, for example, fixed ground radio stations. Also on board there would be provided a pre-recorded flight program unit providing program signals indicating pre-programmed positions for the drone. A primary computer responsive to deviations of the position signals from the program signals in turn generates primary command signals to operate flight controls in the drone in a manner to correct such deviations. The actual path that the drone flies will thus correspond to the pre-programmed mission.

In the event of failure of the primary navigation system on board the drone or in the event of a sudden radio silence from the fixed radio navigation stations, the drone is simply lost. Not only are such losses expensive, but the delay in recovering important data or the delay involved in sending off a back-up drone can be very serious particularly in war time.

BRIEF DESCRIPTION OF THE PRESENT INVENTION

With the foregoing in mind, it is a primary object of the present invention to provide a completely self-contained, on-board navigational system for automatically returning the drone to a pre-assigned recovery area in the event of any failure in the primary navigation system or in navigational signals from fixed ground radio stations, the back-up system itself being operable under complete radio silence.

More particularly, the drone includes heading storage means for storing the heading to a recovery area and a range storage means for storing the range of the drone from the recovery area, the heading and range information being available from the navigational receiver in the primary system and the pre-recorded flight program unit aboard the drone. Failure trigger means responsive to a failure in the primary navigational system then actuates the heading storage means and range storage means so that the particular heading and range stored at the point of time of the failure accurately depict the heading and range of the drone from the recovery area. Simultaneously, an on-board air speed integrating means is actuated. The on-board compass heading of the drone is compared with the stored heading signal to provide suitable steering command signals to the drone auto pilot and thus head the drone back towards the recovery area. Simultaneously, the integrated air speed is compared with the stored range such that when these signals are equal, a land command signal is given to the drone so that a parachute can be deployed or the drone landed by any other suitable means.

An important feature of the invention includes the modifying of the stored heading signal and stored range signal to correct for existing wind conditions so that greater accuracy is realizable in returning the drone to the designated recovery area.

BRIEF DESCRIPTION OF THE DRAWINGS

A better understanding of the invention will be had by now referring to the accompanying drawings in which.

DETAILED DESCRIPTION OF THE INVENTION

Figure 1:
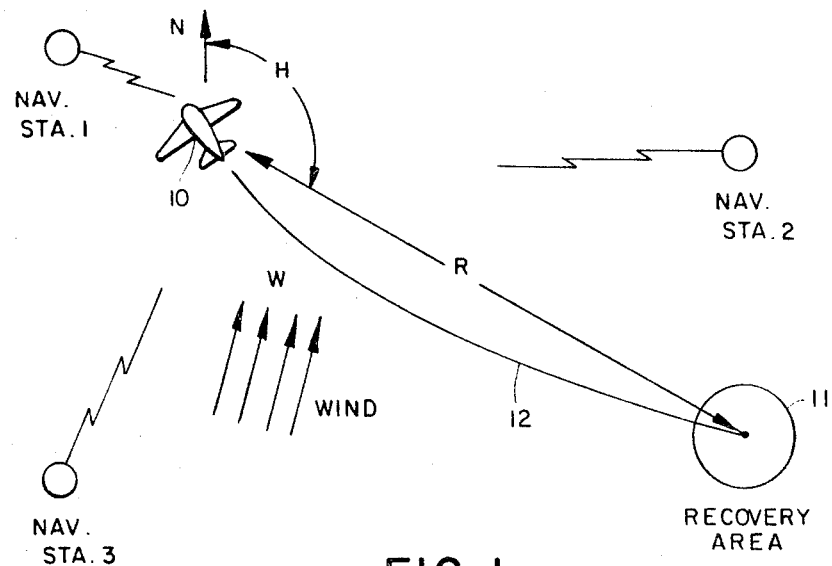
FIG. 1 is plan view illustrating a drone on a flight mission from a designated recovery area useful in explaining the invention; and, FIG. 2 is a detailed block diagram of the dead-reckoning back-up navigational system for the drone of FIG. 1.

Referring to FIG. 1, there is illustrated a typical drone or unmanned aircraft 10 in flight from a recovery area 11 along a predetermined flight path 12. In the example shown in FIG. 1, the recovery area 11 corresponds to the starting point for the drone but it should be understood that any other recovery area for the drone could be designated.

The primary navigational system for the drone auto-pilot includes a radio receiver for navigational signals provided from fixed radio stations. For example, there are shown three such fixed navigation radio stations designated NAV. STA. 1, NAV. STA. 2, and NAV. STA. 3. The signals from these navigation stations may be LORAN type signals wherein a suitable primary on-board computer interprets the signals to define an existing position of the drone at all times. From this information on board the drone, a continuous indication of the heading H back to the recovery area and the range R from the recovery area is always available. A typical wind velocity and direction is illustrated in FIG. 1 by the arrows W.

The pre-programmed flight unit on board the drone 10 of FIG. 1 will cause the drone to follow a pre-assigned path by comparing the programmed position with the existing position as determined by the radio signals received in the navigational receiver aboard the drone. Any deviations of the existing position from the programmed position will provide error signals which control the flight of the drone in such a manner as to maintain it on the pre-assigned path. Normally, the flight mission is programmed to return the drone to its starting point if such is the designated recovery area or to a different selected recovery area at the end of the mission. However, should any failure occur in the primary navigational system, pre-recorded flight program unit, or in the event a radio silence should occur so that further signals from the fixed navigational radio stations are no longer received, the drone would ordinarily be lost.

Figure 2:
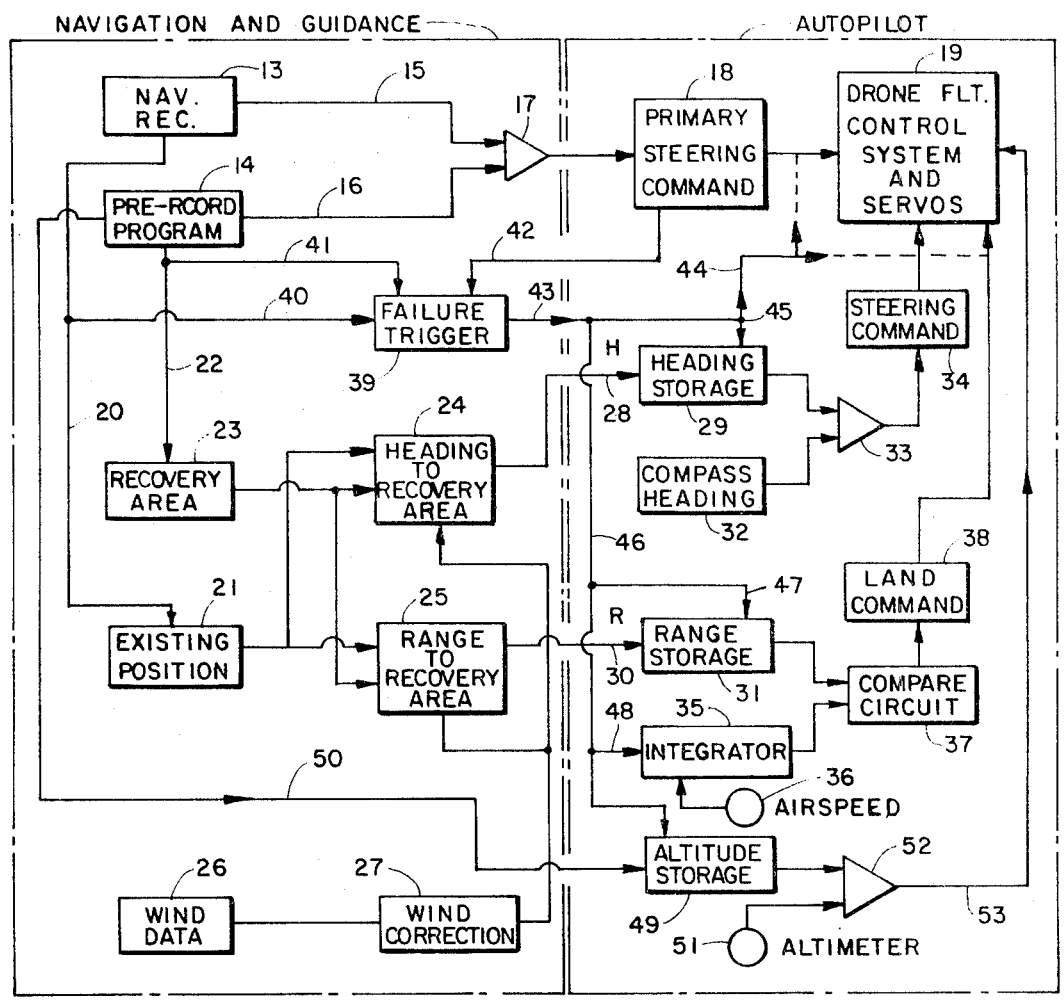

Referring now to FIG. 2, there is illustrated the primary navigation system and the dead reckoning back-up navigational system of the present invention for returning the drone in the event of a failure in the primary system.

More particularly, the primary system includes a navigational signal radio receiver 13 and an on-board pre-recorded program unit for the mission designated 14. Existing position information and pre-recorded flight information are provided on outlet lines 15 and 16 and compared in a unit 17. The output from the unit 17 may take the form of an error signal indicating any deviation in the existing position of the drone and the pre-recorded programmed position. This signal is received in a primary computer 18 for providing a steering command signal to the drone flight control system and servos designated by the block 19.

The various blocks 13 through 19 described above constitute the typical primary navigational system aboard the drone. The remaining blocks on the drawing constitute the dead reckoning back-up navigational system for the drone in accord with the present invention.

This back-up system derives existing position signals from a branch line 20 passing from the navigational receiver 13 to an existing position control unit 21. Simultaneously, the selected recovery area is derived through a branch line 22 from the pre-recorded program unit 14 to a recovery area unit 23. The existing position signals and the recovery area position signals are both passed to the computing units 24 and 25. The unit 24 generates a continuous heading signal defining the heading to the recovery area and the unit 25 provides a range signal defining the range to the recovery area. These signals are modified by suitable correction signals to take into account existing wind conditions. Towards this end, there is illustrated a wind data unit 26 and wind correction signal generator 27 for modifying the heading and range signals in the units 24 and 25.

The corrected heading signal from the unit 24 passes to lead 28 to a heading storage means 29 which continuously stores the heading to the recovery area taking into account the existing wind conditions. Similarly, the corrected range from the unit 25 is passed through an output lead 30 to a range storage means 31 wherein the range to the recovery area is continuously stored suitably corrected to take into account wind conditions.

An on-board compass means 32 provides the compass heading of the drone and this information is compared with the stored heading signal in the unit 25 as by unit 33 which will provide a difference or error signal to a steering command signal generator 34.

An on-board integrator 35 for integrating the air speed as provided by indicator 36 in turn provides a range signal for comparison with the stored range in the unit 31. When these signals are equal, a signal is provided by a compare circuit 37 to a land command signal generator 38.

The system is completed by the provision of a failure logic trigger unit designated by the block 39 is the upper center portion of FIG. 2. This trigger unit includes an input line 40 from the navigational receiver 13, an input line 41 from the pre-recorded program unit 14, and an input line 42 from the primary computer steering command unit 18. A failure in any one of these three components will trigger the failure logic block 39 to provide an output trigger control signal on line 43. This signal is passed to line 44 to disable or disconnect the primary steering command unit 18 from the drone flight control system and servos 19 and enable or connect up the outputs from the steering command unit 34 and land command unit 38 to the drone flight control system and servos 19. In addition, the trigger circuit is passed through a branch line 45 to the heading storage means 29 and through branch lines 46 and 47 to the range storage means 31. Also, the same trigger is passed through branch lead 48 to start the integrator 45.

OPERATION

In operation, existing position signals and recovery area position data are continuously provided by the navigational receiver 13 and pre-recorded program unit 14 for the mission to the units 21 and 23 and thence to heading and range computer units 24 and 25. The computed heading to the recovery area and range from the recovery area of the drone at all times are then continuously stored in the heading storage means 29 and range storage means 31. So long as the primary navigational system is functioning properly, there is no further action by the back-up system described except to continuously store the recovery area heading and recovery area range.

Assume now that some type of failure occurs in either the navigation receiver, pre-recorded program unit, or primary computer system or even in the navigational radio signals from the fixed ground stations. In this event, the failure will be detected by the failure trigger unit 39 over one or more of its input lines 40, 41 or 42. An output trigger on the line 43 will then disconnect the primary steering command unit 18 from the drone flight control system 19 and connect the steering command 34 and land command unit 38 to the drone flight control system. Simultaneously, the same trigger system will trigger the heading storage means 29 and range storage means 31 so that these units provide a consistent signal indicating the heading and range of the recovery area at the precise point in time that the failure occured. Since the heading and range are continuously corrected by the wind conditions up to the point of failure, the stored heading and range values will accurately enable the drone to be returned to the designated recovery area on the assumption that such wind conditions will remain the same during the recovery period.

It will also be recalled that the actuating trigger from the failure logic trigger circuit 39 is passed through branch line 48 to the integrator 35 so that the air speed of the drone is integrated from the point in time that failure occured.

The actual compass heading of the drone by the on-board compass 32 in the form of a signal is compared with the stored heading signal in the storage unit means 29 by the comparator 33 and any error or difference in these signals causes the steering command 34 to provide a steering command signal to the drone flight controls to correct the heading. When the compass heading unit 32 corresponds with the stored heading in the unit 29, the steering command signal will become zero and the drone will stay on the particular heading defined by the stored heading signal in the unit 29.

As the drone heads towards the selected recovery area, the output from the air speed integrator 35 will approach a value corresponding to the recovery area range stored in unit 31. The comparator circuit 37 generates a signal when the integrated air speed equals the stored range to thereby operate the land command unit 38 and trigger suitable mechanism in the drone flight controls to deploy a parachute or otherwise land the drone.

It will be appreciated from the foregoing, that the back-up navigational system is completely self-contained and does not rely on any external radio signals or the like in order to return the drone to a selected recovery area. The dead reckoning operation is greatly increased in accuracy as a consequence of the introduction of wind corrections by the units 26 and 27 in the stored heading and range data.

Thus far, nothing has been mentioned concerning the altitude at which the drone flies. However, once an assigned altitude has been initially reached, it can be maintained constant and special variable controls such as provided for range and heading are not necessary in returning the drone. On the other hand, if the altitude is programmed to vary and a failure should occur when the drone is at a low altitude, it would be desirable to return it at a safe higher altitude since the return path would normally be a straight line dead-reckoned course usually different from the programmed flight course particularly if the recovery area is different from the starting or launch position.

In the foregoing event, the back-up navigational system could include an altitude storage unit such as indicated at 49 in FIG. 2. This unit is connected to the pre-recorded program unit 14 by lead 50 and monitors and stores the altitude. When failure occurs, the same trigger signal from the lead 46 for actuating the range storage unit 31 and integrator 35 would trigger the altitude storage unit 49 and if the drone is not at a safe altitude at the time of failure, a proper constant safe altitude signal will be provided by the unit 49. This signal can then be compared with an actual altitude signal from the drone altimeter shown at 51 in a differential amplifier 52. Any difference in the signal will provide an error signal on output 53 to the flight control 19 to bring the drone to the predetermined safe return altitude.

By utilizing the foregoing system on drones, the chances for recovering drones in which a failure occurs in the primary navigational system are greatly increased all to the end that the cost of a new drone and delays in retrieving valuable information obtained by the drone are avoided.

What is claimed is:

1. A dead reckoning back up navigational system for a drone comprising, in combination:
    a. heading storage means for storing the heading to a recovery area;
    b. range storage means for storing the range of the drone from the recovery area;
    c. on-board compass means providing the existing heading;
    d. on-board air speed integrating means; and
    e. failure trigger means responsive to a failure in the primary navigational system to actuate the heading storage means, range storage means, and air speed integrating means to thereby provide corrective steering command signals to the drone flight control system to cause it to head in the direction defined by the stored heading signal at the time of failure and to land when the integrated air speed equals the stored range at the time of failure, whereby the drone is automatically returned to the recovery area by dead reckoning.

2. A dead-reckoning back-up navigational system according to claim 1, including wind correction means for modifying the stored heading and range information to take into account wind conditions existing at the time of failure.

3. A dead reckoning back-up navigational system for a drone on a flight mission under control of an on-board navigational receiver providing position signals indicating the existing position of the drone at all times in relation to fixed ground radio stations, an on-board pre-recorded flight program unit providing program signals indicating pre-programmed positions for the drone, and primary means responsive to deviations of the position signals from the program signals for generating primary command signals to control the drone flight controls in a manner to correct the deviations, said dead-reckoning back-up navigational system including, in combination:
    a. means connected to the navigational receiver providing existing position signals;
    b. means connected to the pre-recorded flight program unit providing recovery area signals;
    c. means on the drone providing wind correction signals;
    d. heading computer means receiving said existing position signals, recovery area signals, and wind correction signals to generate in response thereto a corrected recovery area heading signal;
    e. range computer means receiving said existing position signals, recovery area signals, and wind correction signals to generate in response thereto a corrected recovery area range signal;
    f. heading storage means connected to said heading computer means for continuously storing said corrected recovery area heading signal;
    g. range storage means connected to said range computer means for continuously storing said corrected recovery area range signal;
    h. on-board compass means for providing a heading signal of the drone at its existing position;
    i. steering command signal means responsive to any differences between the on-board compass heading signal and the stored recovery area heading signal to provide a correction steering signal;
    j. on-board air speed integrating means for providing a range signal indication of the distance the drone has traveled from its existing position;
    k. landing command signal means responsive to said range signal and the stored recovery area range signal to provide a landing command signal when the range signal equals the stored recovery area range signal; and,
    l. failure trigger means responsive to a failure in the on-board navigational receiver, on-board pre-recorded flight program unit or primary means providing primary command signals, to disconnect said primary means and activate the heading and range storage means, and the compass means and air speed integrating means, and connect said steering command signal means and said landing command signal means to the drone flight controls, whereby wholly self-contained control of the drone to return it to and land it at the recovery area is provided.

4. A dead-reckoning back-up navigational system for a drone according to claim 3, including an altitude storage unit for defining a safe return altitude to the recovery area for comparison and with the actual altitude of the drone in the event of a failure to provide a correction altitude signal to the drone flight control system so that the drone will return to the recovery area at the defined altitude.

* * * * *